May 22, 1951      P. SPENCE      2,554,158

VALVE

Filed May 11, 1946

INVENTOR
Paulsen Spence
BY
ATTORNEY

Patented May 22, 1951

2,554,158

UNITED STATES PATENT OFFICE 2,554,158

VALVE

Paulsen Spence, Baton Rouge, La., assignor to Spence Engineering Company, Inc., Walden, N. Y., a corporation of New York Application May 11, 1946, Serial No. 669,177

1 Claim. (Cl. 137—139)

My invention relates to pilot-operated valves and in particular to valves in which the pilot is formed within the main valve structure so as to provide a self-contained regulating mechanism. Regulating valves of conventional design have employed displaceable pistons as moving elements about which pressures are balanced to determine an equilibrium or balanced operating position of the valve. These valves have exhibited undesirable characteristics, particularly in the inherent tendency of their moving parts to stick and thus to offer resistance lags impairing sensitivity of the valve mechanism.

It is, accordingly, an object of my invention to provide an improved compensated regulator valve.

It is also an object to provide an improved regulator valve having essentially non-sticking operating characteristics.

It is another object to provide an improved valve mechanism which will produce a modulation of fluid flow proportional to changes in a controlled medium, in response to and as measured by a controller.

It is a further object to provide improved means for placement of a main valve in proportion to placement of a pilot valve.

Figure 1:
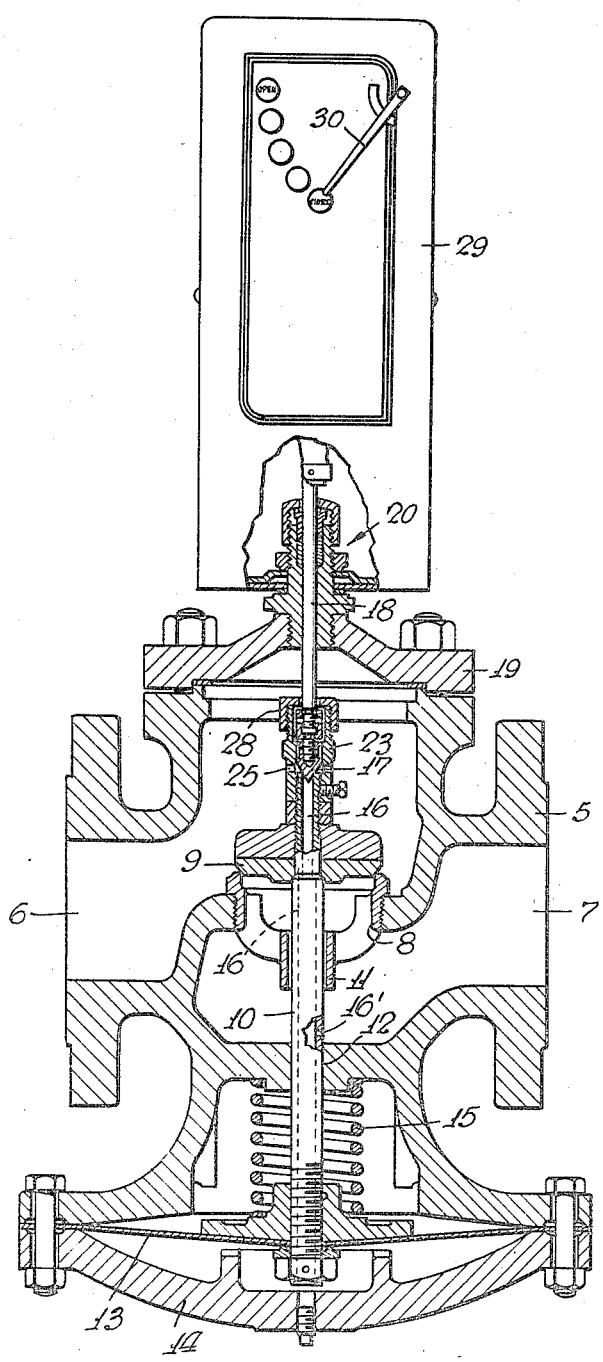
Figure 2:
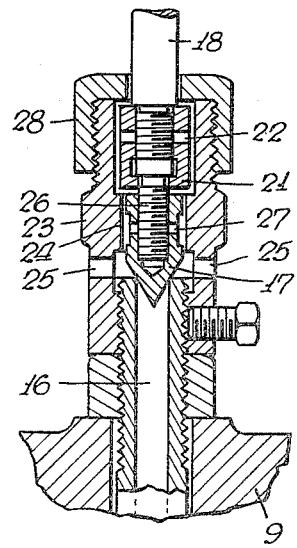

Other objects and various further features of novelty and invention will appear from a reading of the following specification together with the accompanying drawing, in which:

Fig. 1 is a partial vertical cross-section of a valve incorporating features of my invention; and Fig. 2 is an enlarged fragmentary sectional view of the valve of Fig. 1.

Broadly speaking, my invention contemplates improved means for automatically controlling the admission of fluid pressure to a pressure-responsive device for unseating a normally seated valve or for maintaining the flow through the valve at a regulated value. The arrangement of this automatic control is such that the valve is always fully compensated. In the specific form to be described, fluid pressure for operating the pressure-responsive means (a diaphragm) is supplied via a duct in the valve stem, and a selectably movable pilot valve controls admission of upstream fluid pressure to the duct.

Referring to the drawings, the invention is shown in application to a single-disc pressure-actuated valve comprising a valve body 5, defining an inlet chamber 6 and an outlet chamber 7. A valve seat member 8 is supported intermediate chambers 6 and 7; by coaction with the main valve disc 9 it controls the passage of fluid from the inlet 6 to the outlet 7. Valve disc 9 is carried by a stem 10 supported for sliding axial displacement in sleeve guides 11 and 12. As indicated above, displacement of disc 9 is by fluid-pressure actuation; in the form shown this actuation is derived from the motion of a flexible diaphragm 13, capped by a hood 14, which in turn is securely mounted to the valve body 5. Resilient means such as a coil spring 15 normally urges diaphragm 13 and valve stem 10 in a downward direction so as normally to seat the valve disc 9.

According to the invention, means are provided to control the admission of fluid pressure from the inlet chamber 6 to the pressure-responsive chamber defined by diaphragm 13 and hood 14. In the form shown, this communication is effected via a duct 16 extending axially of the valve stem 10; and the control of this communication takes place at the upper end of the duct, where a pilot valve disc 17 is positioned, in a manner to be described later, over the upper open end of duct 16. A bleed opening 16' is included in valve stem 10 to permit the relatively slow bleeding of pressure from duct 16 into the outlet chamber 7.

The mechanism for positioning pilot valve disc 17 comprises an adjustable actuating rod 18 supported coaxially with valve stem 10 in the head 19 of the valve body 5. To permit selective adjustment of the valve 9, the actuating rod 18 extends outside the valve body. Conventional bushing and packing means 20 are provided to assure no leakage of pressure fluid at this point, and also to assure a free sliding fit of rod 18 in the head 19. In the form shown, the lower end of actuating rod 18 threadedly engages a stop collar 21 which, after initial adjustment, may be pinned or otherwise permanently secured to rod 18, as by a pin 22.

Valve stem 10 carries at its upper end a tubular extension 23 having an internal cylindrical guide surface 24 which will permit the free axial sliding motion of pilot valve disc 17, as will be clear. The extension 23 also includes ports or apertures 25 which freely admit pressure fluid from inlet chamber 6 to the region of coaction between pilot valve disc 17 and the upper end of duct 16.

For purposes of initial adjustment, pilot valve disc 17 is supported by a threaded T-member 26 which can effectively extend the axial positioning of disc 17; once the adjustment has been made, the T-member 26 and disc 17 are secured together as by a transverse pin 27 in a manner similar to that employed for the initial adjustment of stop 21 on actuation rod 18. The head of T-member 26 may be supported by an internal shoulder at the lower end of the collar 22. Thus, pilot valve disc 17 is free to slide in the guide 24 carried by valve stem 10, and this sliding motion is limited on the one hand by a seating of the disc 17 on the upper end of duct 16 and, on the other hand, by abutment with the lower end of stop 21, as will be clear.

To limit the free axial motion of stop 21 with respect to valve stem 10, the extension 23 of valve stem 10 carries a cap member 28 having an inwardly turned flange. It will be noted that the design of internal shoulders on extension 23 and on cap 28 is such as to permit small free axial displacement of stop 21 with respect to stem 10.

In operation, the main valve 9 is normally closed, that is, in the absence of a controlling displacement of the actuating rod 18 in an upward direction. Once such upward displacement commences, the pilot valve disc 17 will be withdrawn or displaced upwardly. Although small, and limited by the flange of cap member 28, this motion of the disc 17 with respect to stem 10 opens the pilot valve and admits into duct 16, and hence into the space between diaphragm 13 and hood 14, sufficient fluid pressure to cause actuation of the stem 10 of the main valve. The resulting displacement of valve stem 10 tends to close the pilot-valve opening, while unseating disc 9 to open the main valve. An equilibrium positioning of the main valve is reached when the pressure characteristic of a particular rate of fluid flow through duct 16 and through bleeder 16' is sufficient (when integrated over the effective area of diaphragm 13) to overcome the compressional force of spring 15 and to position the pilot-valve opening (disc 17 over the upper end of duct 16) for just that particular flow; the reference position, about which this equilibrium or balance positioning takes place is, of course, determined by the setting of the actuating rod 18. In the form shown, a control-motor unit 29 having a selector arm 30 employs conventional means for positioning the pilot valve disc 17 and hence for determining the reference position for regulation of flow through the main valve, as will be clear. Thus, with the arrangement described, the balanced placement of the main valve disc 9 will correspond substantially to the selected initial placement of the pilot valve disc 17.

It will be seen that I have provided a regulating valve which lends itself particularly well to sensitive, or non-sticky operation, there being free-sliding clearances (i. e. no stuffing boxes or packing material) between the parts forming the balance mechanism. At the same time, the structure offers features of ruggedness, and of easy assembly and disassembly. Operation is essentially non-sticky even if an uneven gasket (between head member 19 and valve body 5) or inaccurate machining and location of parts should cause slight misalignment of actuating rod 18 with respect to duct 16—for all moving parts of the pilot valve are carried and centered by valve stem 10 and by its extension 23.

Although I have described my invention in considerable detail in connection with the form shown in the drawings, it will be understood that modifications may be made without departure from the scope of the invention as defined in the claim.

I claim:

In a valve, a valve body having inlet and outlet chambers, a valve seat between said chambers, a main valve to seat on said seat, a valve stem secured to said main valve and projecting from both sides thereof, guide means for said stem at one side of said main valve, a diaphragm chamber on said body, a diaphragm in said chamber, the lower end of said valve stem projecting through said diaphragm and secured thereto, the upper end of said stem projecting above said main valve being threaded, a guide bushing for a pilot valve threaded onto the upper end of said stem, a pilot valve slidably guided in said guide bushing, a pilot valve stem secured to said pilot valve and extending into said bushing, a gland nut threaded onto said bushing and having a passage for said pilot valve stem, said pilot valve stem having an abutment for engagement with said gland nut for limiting the upward movement of said pilot valve relatively to said main valve stem, said main valve stem having a bore therethrough controlled at the top by said pilot valve and opening in said diaphragm chamber below said diaphragm, and bleed means from said bore in said main valve stem to the low pressure side of said valve.

PAULSEN SPENCE.

REFERENCES CITED

The following references are of record in the file of this patent:

UNITED STATES PATENTS

| Number | Name | Date |
| --- | --- | --- |
| 624,511 | Littlefield | May 9, 1899 |
| 759,530 | Kelly | May 10, 1904 |
| 778,592 | Lytton | Dec. 27, 1904 |
| 933,855 | Selby | Sept. 14, 1909 |
| 1,005,641 | Gilson | Oct. 10, 1911 |
| 1,456,090 | Bennett | May 23, 1923 |
| 1,894,267 | Foresman | Jan. 17, 1933 |
| 1,934,545 | Langdon | Nov. 7, 1933 |
| 2,426,941 | Mercier | Sept. 2, 1947 |